United States Patent
Zaitsev et al.

(10) Patent No.: US 9,733,732 B2
(45) Date of Patent: Aug. 15, 2017

(54) GENERATING A VIRTUAL ERASER AREA

(71) Applicant: LENOVO (Singapore) PTE, LTD., New Tech Park (SG)

(72) Inventors: Grigori Zaitsev, Durham, NC (US); Russell Speight VanBlon, Raleigh, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 80 days.

(21) Appl. No.: 14/621,165

(22) Filed: Feb. 12, 2015

(65) Prior Publication Data

US 2016/0239111 A1    Aug. 18, 2016

(51) Int. Cl.
*G06F 3/0354* (2013.01)
*G06F 3/041* (2006.01)

(52) U.S. Cl.
CPC ........ *G06F 3/03545* (2013.01); *G06F 3/0416* (2013.01)

(58) Field of Classification Search
CPC ............................ G06F 3/03545; G06F 3/0414
See application file for complete search history.

(56) References Cited

U.S. PATENT DOCUMENTS

| | | | | |
|---|---|---|---|---|
| 5,793,360 A | * | 8/1998 | Fleck | G06F 3/023 178/19.01 |
| 2006/0028457 A1 | * | 2/2006 | Burns | G06F 3/0421 345/179 |
| 2007/0139399 A1 | * | 6/2007 | Cook | G06F 3/03545 345/179 |
| 2007/0176904 A1 | * | 8/2007 | Russo | G06F 3/0488 345/173 |
| 2013/0194242 A1 | * | 8/2013 | Park | G06F 3/03545 345/179 |
| 2014/0306929 A1 | * | 10/2014 | Huang | G06F 3/03545 345/174 |
| 2015/0029161 A1 | * | 1/2015 | Koo | B43K 29/02 345/179 |
| 2016/0299606 A1 | * | 10/2016 | Go | G06F 3/046 |

* cited by examiner

*Primary Examiner* — Priyank Shah
(74) *Attorney, Agent, or Firm* — Kunzler Law Group

(57) ABSTRACT

A processor detects an eraser surface on a touch screen. In addition, the processor generates a virtual eraser area for the touch screen from the eraser surface as the eraser surface shape with the virtual eraser area $VA = K/\sqrt{EA}$ where $K$ is a nonzero constant and $EA$ is an eraser angle between the eraser surface and the touch screen.

20 Claims, 8 Drawing Sheets

GENERATING A VIRTUAL ERASER AREA

BACKGROUND

Field

The subject matter disclosed herein relates to an eraser area and more particularly relates to generating a virtual eraser area.

Description of the Related Art

Data is entered onto displays, particularly touch screen displays, with a pointing device such as an electronic pen, a stylus, or a finger. A user may occasionally need to erase entered data.

BRIEF SUMMARY

An apparatus for generating a virtual eraser area is disclosed. The apparatus includes a touch screen, a processor, and a memory. The memory stores code that detects an eraser surface on the touch screen. In addition, the code generates a virtual eraser area for the touch screen from the eraser surface. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
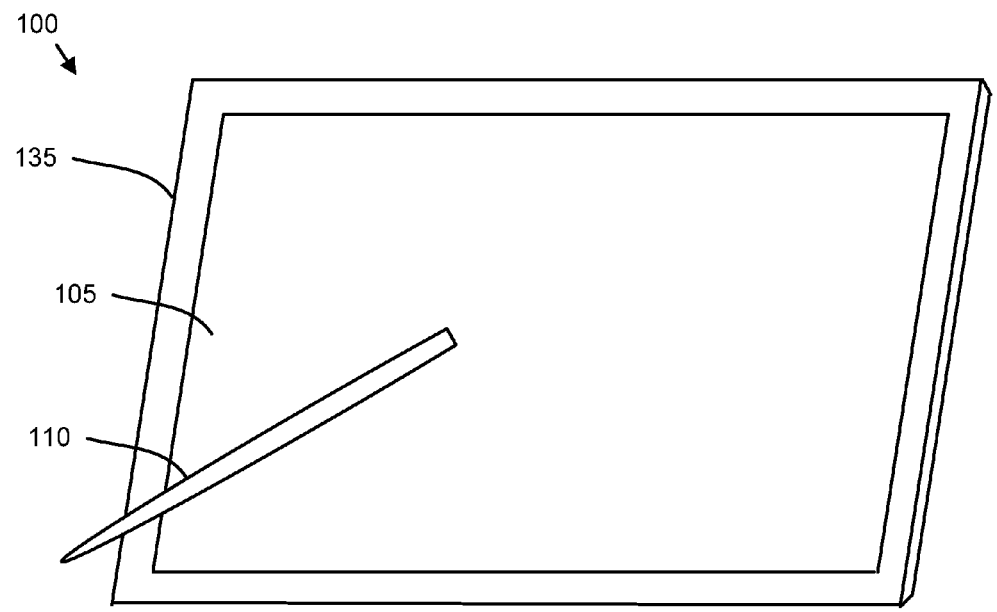
FIG. 1A is a perspective drawing illustrating one embodiment of a data entry system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of a data entry system 100. The system 100 depicts an electronic device 135 with a touch screen 105. A user may employ a pointing device 110 such as an electronic pen, a stylus, or a finger to enter data onto the touch screen 105. For example, an electronic pen pointing device 110 may be used to enter text on to the touch screen 105.

The user may also wish to remove data from the touch screen 105. In the past, the touch screen 105 has been configured so that the pointing device 110 erases data rather than enters data onto the touch screen 105. For example, the user may select an eraser option to use the pointing device 110 as an eraser.

However, selecting the eraser option requires the user identify and find the eraser option in the menu. In addition, the user may be required to manually select a virtual eraser area for the eraser option. As a result, the erasure of data requires a certain level of training and/or knowledge in order for the user to employ the eraser option.

The embodiments described herein detect an eraser surface on the touch screen 105. The touch screen may be a capacitive touch screen, a resistive touch screen, or the like.

The embodiments further generate a virtual eraser area for the touch screen 105 from the eraser surface. As a result, the user need only apply the eraser surface to the touch screen 105 to generate the virtual eraser area.

The user may manipulate the virtual eraser area using the eraser surface to erase data from the touch screen 105. In addition, the user may modify the virtual eraser area and/or modify functions of the virtual eraser area using the eraser surface in a manner that is both intuitive and natural. As a result, the user is able to erase data from the touch screen 105 without explicit training in and/or knowledge of eraser option functions.

Figure 1B:
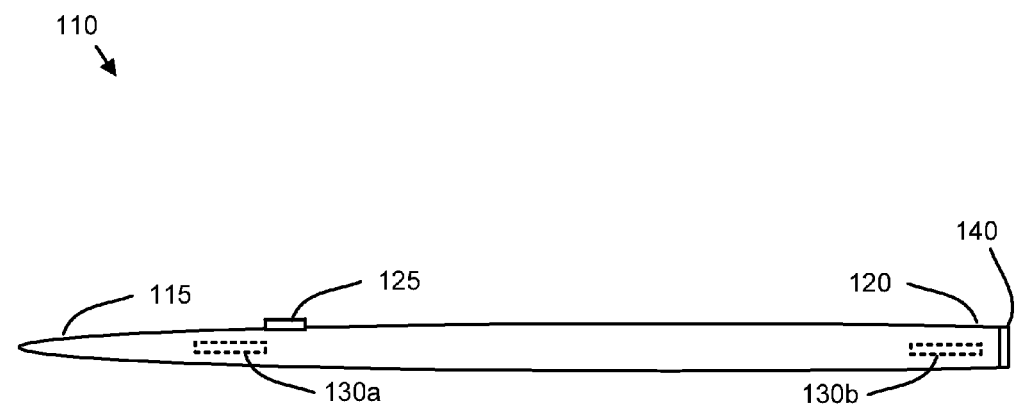
FIG. 1B is a drawing illustrating one embodiment of an electronic pen.

FIG. 1B is a drawing illustrating one embodiment of an electronic pen pointing device 110. The electronic pen pointing device 110 includes a proximal end 115 and a distal end 120. The proximal end 115 may be employed to enter data on the touch screen 105. An eraser surface 140 may be disposed on the distal end 120.

In one embodiment, the eraser surface 140 has a distinctive shape that may be used to identify the eraser surface 140. For example, the eraser surface 140 may have one of a square, triangular, round, oval, and/or rectangular shape. The shape of the eraser surface 140 may be distinct from the shape of the proximal end 115 of the pointing device 110. Alternatively, the eraser surface 140 may have a distinctive area. For example, the eraser surface 140 may have an area larger than the proximal end 115 and/or a finger.

In one embodiment, the eraser surface 140 has a distinctive proximity sensor signature when detected by a proximity sensor. In addition, the eraser surface 140 may have a distinctive capacitive signature when detected by a capacitance sensor. Alternatively, the eraser surface 140 may have a distinctive resistive signature when detected by a resistive sensor. In a certain embodiment, the eraser surface 140 has a distinctive electromagnetic signature when detected by an electromagnetic sensor. In addition, the eraser surface 140 may have a distinctive acoustic signature when detected by an acoustic sensor.

In one embodiment, the eraser surface 140 is detected from an electronic pen profile of the electronic pen pointing device 110. The electronic pen profile may be captured from a video camera to the side of the pointing device 110 and may indicate whether the proximal end 115 or the distal end 120 is in communication with the touch screen 105.

In one embodiment, the electronic pen pointing device 110 includes one or more transmitters 130. The transmitters 130 may be acoustic transmitters, electromagnetic transmitters, and/or radio transmitters. Each transmitter 130 may have a distinctive signature. The touch screen 105 and/or electronic device 135 may detect the distinctive signature of each transmitter 130 and identify either the proximal end 115 or the distal and 120 from the signature. For example, the distal end 120 may be identified from one of a distinctive radio signature, a distinctive acoustic signature, and/or a distinctive electromagnetic signature from a second transmitter 130b. The touch screen 105 and/or electronic device 135 may determine that the strongest signal is from the closest transmitter 130 and identify the proximal end 115 and/or distal end 120 from the signature of the strongest signal.

Alternatively, the eraser surface 140 may be distinct from a pointing device 110. For example, the eraser surface 140 may be on a separate dedicated eraser. In addition, the eraser surface 140 may be a portion of a hand, such as a palm or heel of the hand.

Figure 2A:
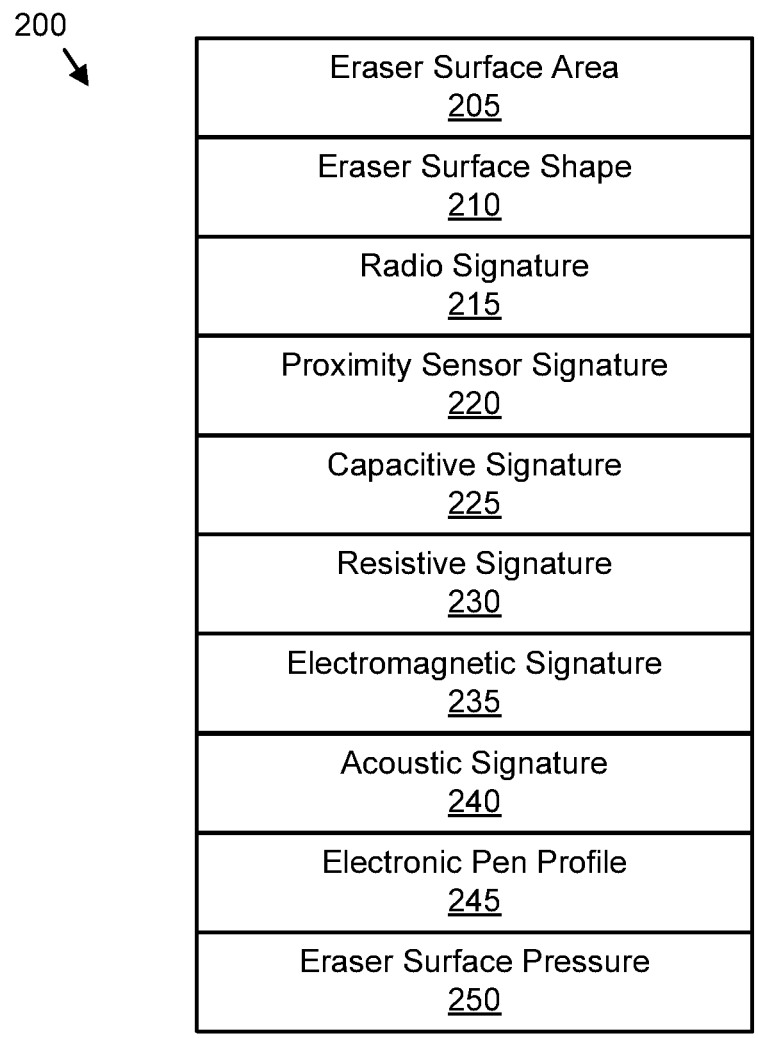
FIG. 2A is a schematic block diagram illustrating one embodiment of eraser surface data.

FIG. 2A is a schematic block diagram illustrating one embodiment of eraser surface data 200. The eraser surface data 200 may describe the interaction of the eraser surface 140 with the touch screen 105. The eraser surface data 200 maybe organized as a data structure in a memory. In the depicted embodiment, the eraser surface data 200 includes an eraser surface area 205, an eraser surface shape 210, a radio signature 215, a proximity sensor signature 220, a capacitive signature 225, a resistive signature 230, an electromagnetic signature 235, an acoustic signature 240, an electronic pen profile 245, and an eraser surface pressure 250.

The eraser surface area 205 may record an actual surface area of the eraser surface 140. In addition, the eraser surface area 205 may record a measured surface area of the eraser surface 140 as detected by the touch screen 105.

The eraser surface shape 210 may record an actual shape of the eraser surface 140. In addition, the eraser surface shape 210 may record a measured surface shape of the eraser surface 140 as detected by the touch screen 105.

The radio signature 215 may record an expected radio signature for the eraser surface 140. In addition, the radio signature 215 may record a measured radio signature for the eraser surface 140.

The capacitive signature 225 may record an expected capacitive signature for the eraser surface 140. In addition, the capacitive signature 225 may record a measured capacitive signature for the eraser surface 140.

The resistive signature 230 may record an expected resistive signature for the eraser surface 140. In addition, the resistive signature 230 may record a measured resistive signature for the eraser surface 140.

The electromagnetic signature 235 may record an expected electromagnetic signature for the eraser surface 140. In addition, the electromagnetic signature 235 may record a measured electromagnetic signature for the eraser surface 140.

The acoustic signature 240 may record an expected acoustic signature for the eraser surface 140. In addition, the acoustic signature 240 may record a measured acoustic signature for the eraser surface 140.

The electronic pen profile 245 may record an expected profile of the electronic pen pointing device 110. In addition, the electronic pen profile 245 may record an image of the electronic pen pointing device 210 as captured by a camera of the electronic device 135.

The eraser surface pressure 250 may record a pressure of the eraser surface 140 on the touch screen 105. The eraser surface pressure 250 may be estimated as a function of a deformation of display cells in the touch screen 105. Alternatively, the eraser surface pressure 250 may be measured by strain gauges embedded in the touch screen 105.

Figure 2B:
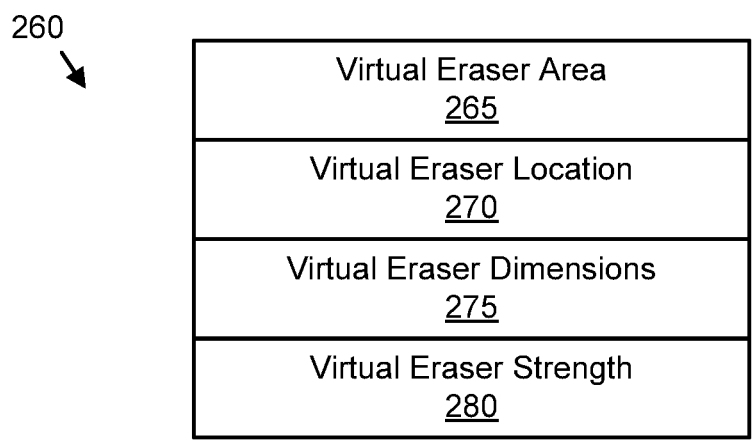
FIG. 2B is a schematic block diagram illustrating one embodiment of virtual eraser area data.

FIG. 2B is a schematic block diagram illustrating one embodiment of virtual eraser data 260. The virtual eraser data 260 may specify the virtual eraser area on the touch screen 105. The virtual eraser data 260 maybe organized as a data structure in the memory. In the depicted embodiment, the virtual eraser data 260 includes a virtual eraser size 265, a virtual eraser location 270, virtual eraser dimensions 275, and a virtual eraser strength 280.

The virtual eraser size 265 may specify a size of the virtual eraser area. The size may be a relative size such as small, medium, and large. Alternatively, the size may be an absolute size such as one square centimeter.

The virtual eraser location 270 may describe the location of the virtual eraser area on the touch screen 105. The virtual eraser dimensions 275 may specify the dimensions of the virtual eraser area. In one embodiment, the virtual eraser dimensions 275 specifies a shape, a length, and an angle of each edge of the virtual eraser area.

The virtual eraser strength 280 may specify a percentage of data that is erased by the virtual eraser area. For example, a virtual eraser strength 280 of 100 percent may completely erase data on the touch screen 105 while a virtual eraser strength 280 of 50 percent may only erase every other pixel.

Figure 3A:
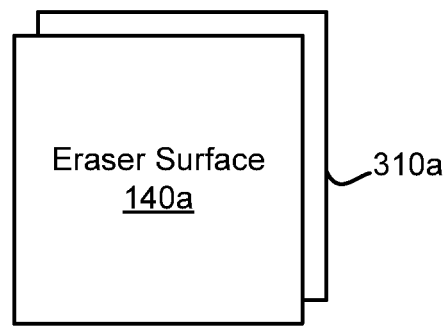
FIG. 3A is a drawing illustrating one embodiment of an eraser surface and a virtual eraser area.

FIG. 3A is a drawing illustrating one embodiment of an eraser surface 140a and a virtual eraser area 310a on the touch screen 105. For clarity, the virtual eraser area 310a is slightly offset from the eraser surface 140a. In one embodiment, a center of the virtual eraser area 310 is aligned with a center of the eraser surface 140 on the touch screen 105. Alternatively, the center of the virtual eraser area 310 may be offset from the center of the eraser surface 140 on the touch screen 105. In the depicted embodiment, the detection of the eraser surface 140a generates a virtual eraser area 310a of substantially the same size, wherein substantially the same size is within 10 percent of a size. As a result, the generated virtual eraser area 310a tracks the eraser surface 140a in position and area.

Figure 3B:
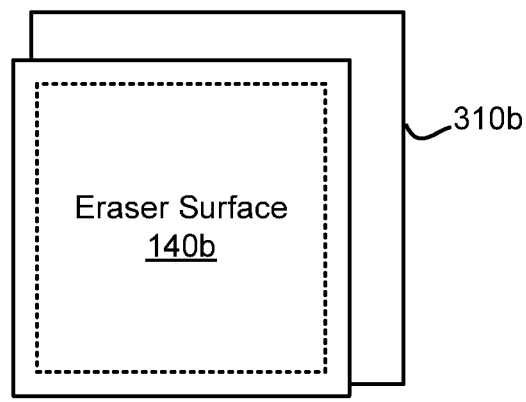
FIG. 3B is a drawing illustrating one alternate embodiment of an eraser surface and a virtual eraser area.

FIG. 3B is a drawing illustrating one alternate embodiment of an eraser surface 140b and a virtual eraser area 310b. For clarity, the virtual eraser area 310b is slightly offset from the eraser surface 140b. In the depicted embodiment, the eraser surface 140b spreads as a result of pressure of the eraser surface 140b against the touch screen 105. As a result, the eraser surface 140b has an area that is larger than the area of the eraser surface 140a illustrated in FIG. 3A, which is shown by the dotted line. In response to detecting the eraser surface 140b, the virtual eraser area 310b is generated with an area that is substantially larger than the area of the eraser surface 140b, wherein substantially larger is greater than 10 percent. The generated virtual eraser area 310b may track the eraser surface 140b in position with a larger area. Alternatively, the generated virtual eraser area 310 may track the eraser surface 140 in position with a smaller area.

Figure 3C:
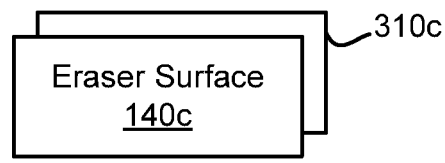
FIG. 3C is a drawing illustrating one alternate embodiment of an eraser surface and a virtual eraser area.

FIG. 3C is a drawing illustrating one alternate embodiment of an eraser surface 140c and a virtual eraser area 310c. For clarity, the virtual eraser area 310c is slightly offset from the eraser surface 140c. In the depicted embodiment, the eraser surface 140c has a rectangular shape. The rectangular shape may result from a user holding the pointing device 110 at an angle to the touch screen 105 so that only a portion of the eraser surface 140c is in contact with the touch screen 105. In response to detecting the eraser surface 140c, a rectangular virtual eraser area 310c is generated.

Figure 3D:
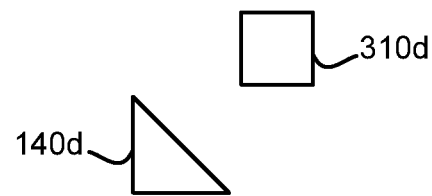
FIG. 3D is a drawing illustrating one alternate embodiment of an eraser surface and a virtual eraser area.

FIG. 3D is a drawing illustrating one alternate embodiment of an eraser surface 140d and a virtual eraser area 310d. In the depicted embodiment, the eraser surface 140d has a triangular-shaped. The triangular-shaped may result from a user positioning the eraser surface 140d so that only a corner of the eraser surface 140d is in contact with the touch screen 105. In response to detecting the eraser surface 140d, a square virtual eraser area 310d is generated. The virtual eraser area 310d is offset from the eraser surface 140d so that the virtual eraser area 310d is not obscured by the pointing device 110 and/or the eraser surface 140d. The virtual eraser area 310 may track the eraser surface 140 at a specified offset. In addition, the area of the virtual eraser area 310 and the shape of the virtual eraser area 310 may be a function of the area and the shape of the eraser surface 140, but may be different in area and/or shape.

Figure 3E:
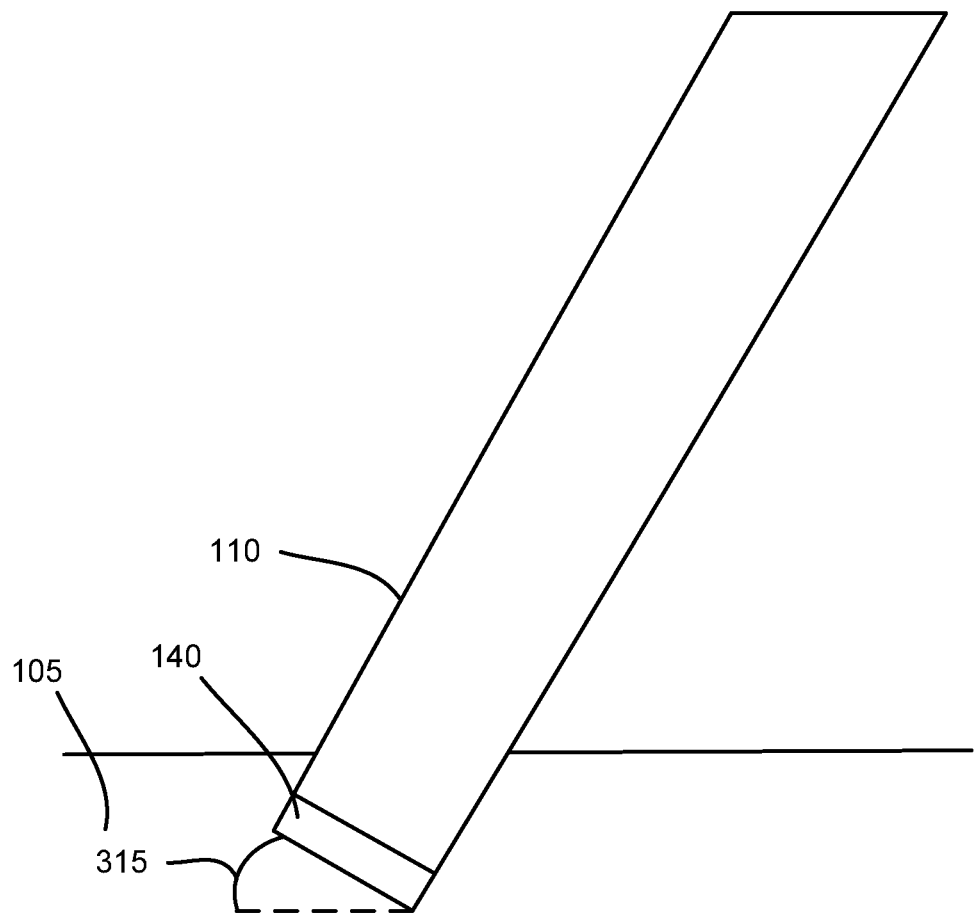
FIG. 3E is a perspective drawing illustrating one embodiment of an eraser angle.

FIG. 3E is a perspective drawing illustrating one embodiment of an eraser angle 315. In the depicted embodiment, the eraser surface 140 contacts the touch screen 105 at an eraser angle 315 to the touch screen 105. The virtual eraser area 310 may be calculated as a function of the eraser angle 315 of the eraser surface 140 to the touch screen 105.

Figure 4:
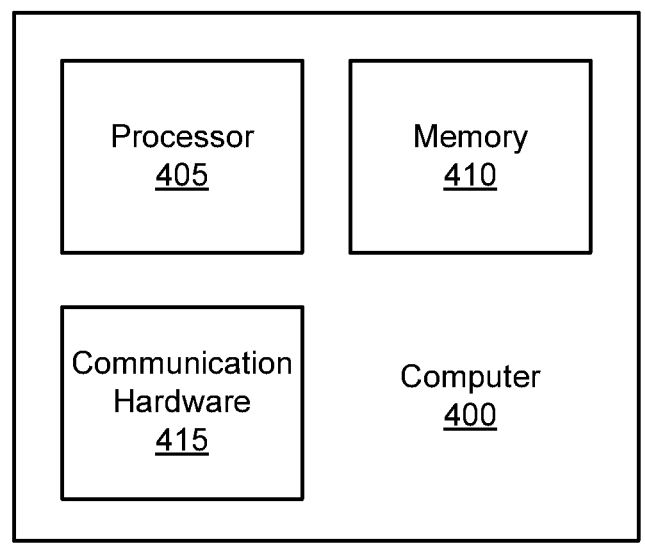
FIG. 4 is a schematic block diagram illustrating one embodiment of a computer.

FIG. 4 is a schematic block diagram illustrating one embodiment of a computer 400. The computer 400 may be embedded in the electronic device 135. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
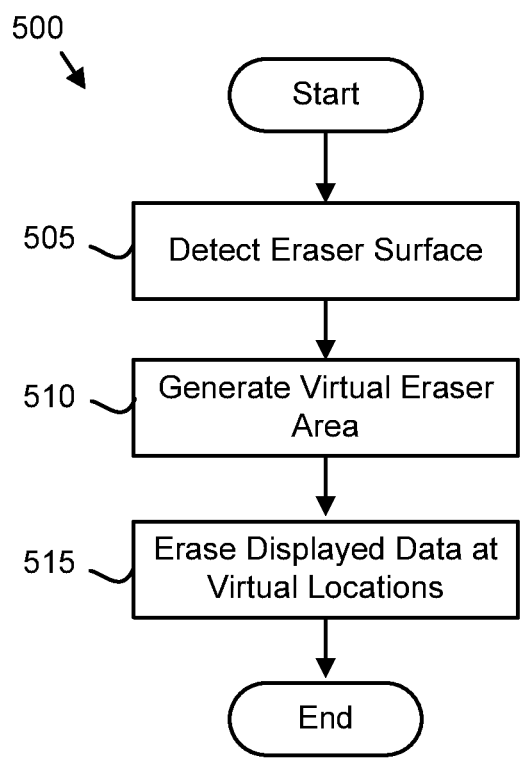
FIG. 5 is a schematic flow chart diagram illustrating one embodiment of a virtual eraser area generation method.

FIG. 5 is a schematic flow chart diagram illustrating one embodiment of a virtual eraser area generation method 500. The method 500 generates the virtual eraser area 310 from the eraser surface 140. The method 500 may be performed by the processor 405. Alternatively, the method 500 may be performed by a computer readable storage medium such as the memory 410. The computer readable storage medium may store code that is executed by the processor 405 to perform the functions of the method 500.

The method 500 starts and in one embodiment, the code detects 505 the eraser surface 140. The code may detect 505 the eraser surface 140 on the touch screen 105. The touch screen 105 may employ capacitive detection, resistive detection, surface acoustic wave detection, surface capacitance detection, projected capacitance detection, mutual capacitance detection, self capacitance detection, infrared grid detection, infrared acrylic projection detection, optical imaging detection, dispersive signal detection, acoustic pulse recognition detection, electromagnetic wave detection, or the like to detect 505 the eraser surface 140. Alternatively, the transmitter 130 may transmit a signal such as an acoustic signal, an optical signal, and/or radio signal and the touch screen 105 and/or electronic device 135 may detect the signal to detect 505 the eraser surface 140.

In one embodiment, the eraser surface 140 is detected 505 in response to one or more of an area of the eraser surface in physical communication with the touch screen as recorded in the eraser surface area 205, a shape of the eraser surface in physical communication with the touch screen as recorded in the eraser surface shape 210, the radio signature 215, the proximity sensor signature 220, the capacitive signature 225, the resistive signature 230, the electromagnetic signature 235, the acoustic signature 240, and the electronic pen profile 245. The code may further record the eraser surface area 205, the eraser surface shape 210, the radio signature 215, the proximity sensor signature 220, the capacitive signature 225, the resistive signature 230, the electromagnetic signature 235, the acoustic signature 240, and/or the electronic pen profile 245.

For example, if the measured eraser surface area and the expected eraser surface area stored in the eraser surface area are substantially similar, where areas within 10% are substantially similar, the eraser surface 140 may be detected 505. Alternatively, if the acoustic signature 240 indicates that the distal end 120 is nearer the touch screen, the eraser surface 140 may be detected 505.

The code may further generate 510 the virtual eraser area 310 for the touch screen 105 from the eraser surface 140. In one embodiment, the virtual eraser area 310 is generated 510 as a function of a percentage of the eraser surface 140 in physical communication with the touch screen 105. For example, the virtual eraser area VA 310 may be calculated using Equation 1, where K is a nonzero constant and EP is the percentage of the eraser surface 140 in physical communication with the touch screen 105.

$$VA = K*EP \qquad \text{Equation 1}$$

The virtual eraser area 310 may be larger than the eraser surface 140, smaller than the eraser surface 140, or substantially the same size as the eraser surface 140. Alternatively, the virtual eraser area 310 may be generated 510 is a function of the eraser angle 315. For example, the virtual eraser area VA 310 may be calculated using Equation 2, where K is the nonzero constant and EA is the eraser angle 315.

$$VA = K/\sqrt{EA} \qquad \text{Equation 2}$$

In one embodiment, the virtual eraser area 310 may be generated 510 as a function of a pressure of the eraser surface 140 on the touch screen 105. For example, the virtual eraser area VA 310 may be calculated using Equation 3, where K is the nonzero constant and SP is the eraser surface pressure 250.

$$VA = K*SP \qquad \text{Equation 3}$$

The virtual eraser strength 280 may be calculated as a function of the pressure of the eraser surface 140 on the touch screen 105. For example, the virtual eraser strength 280 may be calculated using Equation 4, where K is the nonzero constant and SP is the eraser surface pressure 250.

$$VS = \max(100\%, K*SP) \qquad \text{Equation 4}$$

In one embodiment, the code erases 515 displayed data from the touch screen 105 at virtual locations that intersect the virtual eraser area 310 and the method 500 ends. The display data may be erased 515 as a function of the virtual eraser strength 280.

The embodiments detect the eraser surface 140 and generate the virtual eraser area 310 from the eraser surface 140. As a result, the user does not need to select an eraser option in order to use the pointing device 110 to erase data from the touch screen 105. In addition, the user may manipulate the size and/or shape of the virtual eraser area 310 by manipulating the eraser surface 140 and/or the contact of the eraser surface 140 on the touch screen 105. Thus the control of the virtual eraser area 310 is simpler and more intuitive for the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a touch screen;
a processor;
a memory that stores code executable by the processor to:
detect an eraser surface contacting the touch screen using capacitive detection;
detect an eraser angle between the eraser surface and the touch screen using one or more of a video camera, an acoustic transmitter, an electromagnetic transmitter, and a radio transmitter; and
generate a virtual eraser area for the touch screen from the eraser surface as an eraser surface shape of the eraser surface with the virtual eraser area $VA = K/\sqrt{EA}$ where K is a nonzero constant and EA is the eraser angle between the eraser surface and the touch screen.

2. The apparatus of claim 1, wherein the processor further erases displayed data from the touch screen at virtual locations that intersect the virtual eraser area.

3. The apparatus of claim 1, wherein the eraser surface is disposed on a distal end of an electronic pen.

4. The apparatus of claim 1, wherein the virtual eraser area is further a function of a percentage of the eraser surface in physical communication with the touch screen.

5. The apparatus of claim 1, wherein the virtual eraser area is further a function of a pressure of the eraser surface on the touch screen.

6. The apparatus of claim 1, wherein a virtual eraser strength is further a function of a pressure of the eraser surface on the touch screen, wherein the virtual eraser strength specifies a percentage of data that is erased by the virtual eraser area.

7. The apparatus of claim 1, wherein the eraser surface is further detected in response to one or more of an area of the eraser surface in physical communication with the touch screen, a radio signature, a proximity sensor signature, a resistive signature, an electromagnetic signature, an acoustic signature, and an electronic pen profile.

8. The apparatus of claim 7 wherein the eraser surface spreads as a result of pressure.

9. The apparatus of claim 1, wherein the eraser surface contacts the touch screen at the eraser angle.

10. A method comprising:
detecting, by use of a processor, an eraser surface contacting a touch screen using capacitive detection;
detecting an eraser angle between the eraser surface and the touch screen using one or more of a video camera, an acoustic transmitter, an electromagnetic transmitter, and a radio transmitter; and
generating a virtual eraser area for the touch screen from the eraser surface as an eraser surface shape of the eraser surface with the virtual eraser area $VA = K/\sqrt{EA}$ where K is a nonzero constant and EA is the eraser angle between the eraser surface and the touch screen.

11. The method of claim 10, the method further comprising erasing displayed data from the touch screen at virtual locations that intersect the virtual eraser area.

12. The method of claim 10, wherein the eraser surface is disposed on a distal end of an electronic pen.

13. The method of claim 10, wherein the virtual eraser area is further a function of a percentage of the eraser surface in physical communication with the touch screen.

14. The method of claim 10, wherein the virtual eraser area is further a function of an angle of the eraser surface to the touch screen.

15. The method of claim 10, wherein the virtual eraser area is further a function of a pressure of the eraser surface on the touch screen.

16. The method of claim 10, wherein a virtual eraser strength is further a function of a pressure of the eraser surface on the touch screen.

17. The method of claim 10, wherein the eraser surface is detected in response to one or more of an area of the eraser surface in physical communication with the touch screen, a proximity sensor signature, a resistive signature, an electromagnetic signature, an acoustic signature, and an electronic pen profile.

18. A program product comprising a non-transitory computer readable storage medium that stores code executable by a processor, the executable code comprising code to perform:
detecting an eraser surface contacting a touch screen using capacitive detection;

detecting an eraser angle between the eraser surface and the touch screen using one or more of a video camera, an acoustic transmitter, an electromagnetic transmitter, and a radio transmitter; and generating a virtual eraser area for the touch screen from the eraser surface as an eraser surface shape of the eraser surface with the virtual eraser area $VA=K/\sqrt{EA}$ where K is a nonzero constant and EA is the eraser angle between the eraser surface and the touch screen.

19. The program product of claim 18, the code further performing erasing displayed data from the touch screen at virtual locations that intersect the virtual eraser area.

20. The program product of claim 18, wherein the eraser surface is disposed on a distal end of an electronic pen.

* * * * *